United States Patent
Yamamoto et al.

(10) Patent No.: US 6,674,704 B2
(45) Date of Patent: Jan. 6, 2004

(54) METHOD OF MANUFACTURING DISC DRIVE, APPARATUS FOR MANUFACTURING DISC DRIVE, AND DISC DRIVE

(75) Inventors: Ichiro Yamamoto, Yokohama (JP); Motoji Oono, Hadano (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 384 days.

(21) Appl. No.: 09/734,733

(22) Filed: Dec. 13, 2000

(65) Prior Publication Data

US 2001/0005345 A1 Jun. 28, 2001

(30) Foreign Application Priority Data

Dec. 13, 1999 (JP) .......................................... 11-353171

(51) Int. Cl.⁷ ................................................. G11B 7/00
(52) U.S. Cl. .................................................. 369/53.19
(58) Field of Search .......................... 369/44.32, 53.19, 369/47.39, 271; 29/603.03

(56) References Cited

U.S. PATENT DOCUMENTS 6,041,030 A * 3/2000 Ohmi ...................... 369/53.19
6,122,237 A * 9/2000 Ohmori et al. .......... 369/53.19

* cited by examiner

Primary Examiner—Nasil Hindi
(74) Attorney, Agent, or Firm—Pillsbury Winthrop LLP

(57) ABSTRACT

An apparatus for manufacturing a disc drive comprises an adjusting element, put in contact with a disc table engaged with a rotational shaft of a drive motor via an engaging portion, for varying an inclination of the disc table which is swingable with a point of support at the engaging portion, a non-contact displacement measuring unit for detecting, the inclination of the disc table varied by the adjusting element, control unit for receiving a detection signal from the non-contact displacement measuring unit and stopping rotation of the drive motor when the inclination of the disc table has decreased to a predetermined value or less, and an adhesive supply unit for fixing the disc table to the rotational shaft of the drive motor which has been stopped by the control unit.

12 Claims, 3 Drawing Sheets

METHOD OF MANUFACTURING DISC DRIVE, APPARATUS FOR MANUFACTURING DISC DRIVE, AND DISC DRIVE

CROSS-REFERENCE TO RELATED APPLICATIONS

This application is based upon and claims the benefit of priority from the prior Japanese Patent Application No. 11-353171, filed Dec. 13, 1999, the entire contents of which are incorporated herein by reference.

BACKGROUND OF THE INVENTION

The present invention relates to a method of manufacturing a disc drive such as a DVD drive, to an apparatus for manufacturing the optical disc drive, and to the optical disc drive.

FIG. 5 shows a conventional optical disc drive such as a DVD drive. A disc table 2 is fitted on a rotational shaft 1a of a spindle motor 1 serving as a drive motor. An optical disc 3 such as a DVD disc is supported on the disc table 2 and rotated.

An important requirement for the optical disc drive is the "surface precision" of a disc mounting surface 2a of the disc table 2 relative to an axis S of the spindle motor rotational shaft 1a (i.e. the precision of the level of the disc mounting surface relative to the rotational shaft while the surface is being rotated). If there occurs even a slight surface run-out of the disc table 2 (i.e. "wobbling" of the table 2) while the rotational shaft 1a is being rotated, the surface of the optical disc 3 will similarly wobble, resulting in defective information reproduction or recording.

In particular, in a DVD drive which requires high rotational precision, a brushless motor is used as the spindle motor 1. In order to enhance the surface precision of the disc table 2, the run-out of the disc mounting surface 2a of the disc table 2 is detected after the DVD drive is assembled as shown in FIG. 5. Then, the disc table 2 is removed from the rotational shaft 1a of the spindle motor 1, and the disc mounting surface 2a of the disc table 2 is machined to reduce the run-out.

Specifically, half-blanking is carried out to form three projecting portions from the back side of the disc mounting surface 2a of disc table 2. The three projections are disposed equidistantly in a circle defined at the same radial distance on the back surface of the disc mounting surface 2a. A plane defined by the three points of these projecting portions is adjusted so as to become perpendicular to the axis S of the rotational shaft 1a.

FIG. 6 shows a CD drive which requires less mechanical rotational precision than the DVD drive. Thus, a general-purpose brushed motor (a motor with a brush), etc. can be used as a spindle motor 1A and the manufacturing cost can be reduced accordingly.

That surface of the spindle motor 1A, from which a rotational shaft 1a projects, is placed on a chassis 4 and fixed by attachment screws 5. A disc table 2a is fitted on the rotational shaft 1a by means of press-fitting, etc.

In this CD drive, as shown in FIG. 7, in order to eliminate the surface run-out, a cutting process is performed to make a disc mounting surface 2a of disc table 2A perpendicular to the axis S of the rotational shaft 1a in the state in which the disc table 2A is fitted on the rotational shaft 1a that has been removed from the spindle motor 1A. Thereafter, the rotational shaft 1a with the disc table 2A is assembled into the spindle motor 1A.

In the case of the DVD drive shown in FIG. 5, however, the manufacturing cost increases because the run-out of the disc mounting surface 2a is measured once the DVD drive has been assembled, following which the DVD drive is disassembled, the disc table 2 is machined and the drive is assembled once again. Furthermore, since the expensive brushless motor is used as spindle motor 1, the manufacturing cost increases.

On the other hand, in the case of the CD drive shown in FIG. 6, when a commercially available optical disc with low precision of the center of gravity is mounted and rotated, even if a high-prevision brushed motor is used, the rotational shaft 1a is rotated with an elastic deformation caused by centrifugal force due to mass eccentricity of the optical disc. As a result, the precision in rotation deteriorates and satisfactory reproduction/recording cannot be performed.

BRIEF SUMMARY OF THE INVENTION

A first object of the present invention is to provide a disc drive, such as a DVD drive requiring high rotational precision, which is realized with a simple, inexpensive structure like a CD drive.

According to an aspect of the invention, there is provided an apparatus for manufacturing a disc drive, the apparatus comprising: urging means, put in contact with a disc table engaged with a rotational shaft of a drive motor via an engaging portion, for varying an inclination of the disc table which is swingable with a point of support at the engaging portion; detection means for detecting, in a non-contact state, the inclination of the disc table varied by the urging means; control means for receiving a detection signal from the detection means and stopping rotation of the drive motor when the inclination of the disc table has decreased to a predetermined value or less; and fixing means for fixing the disc table to the rotational shaft of the drive motor which has been stopped by the control means.

According to the present invention, even in a case of a disc drive requiring high rotational precision, a disc table can be fixed to a rotational shaft of a spindle motor while the position of the disc table is being adjusted. Therefore, a mechanism with a simple, inexpensive structure can be obtained.

A second object of the invention is to provide an optical disc drive wherein, even when an optical disc such as a disc with mass eccentricity, which may deteriorate precision in rotation, is to be driven, run-out of the disc table can be exactly limited and high rotational precision is maintained, and therefore the reliability in information reproduction/recording can be enhanced.

According to another aspect of the invention, there is provided an optical disc drive comprising: a drive motor; a disc table for mounting of an optical disc, the disc table being fixed to a rotational shaft of the drive motor; reproducing/recording means for effecting information reproduction/recording by radiating a laser beam to the optical disc; a chassis fixed to a rotational shaft projection surface of the drive motor; and a bearing member, provided on the chassis, for supporting the rotational shaft of the drive motor, which is located near the disc table.

According to the invention, the rotational shaft is supported at two points within the motor body and it is also supported at a third point by the bearing member. Therefore, the occurrence of centrifugal force due to mass eccentricity of the disc can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
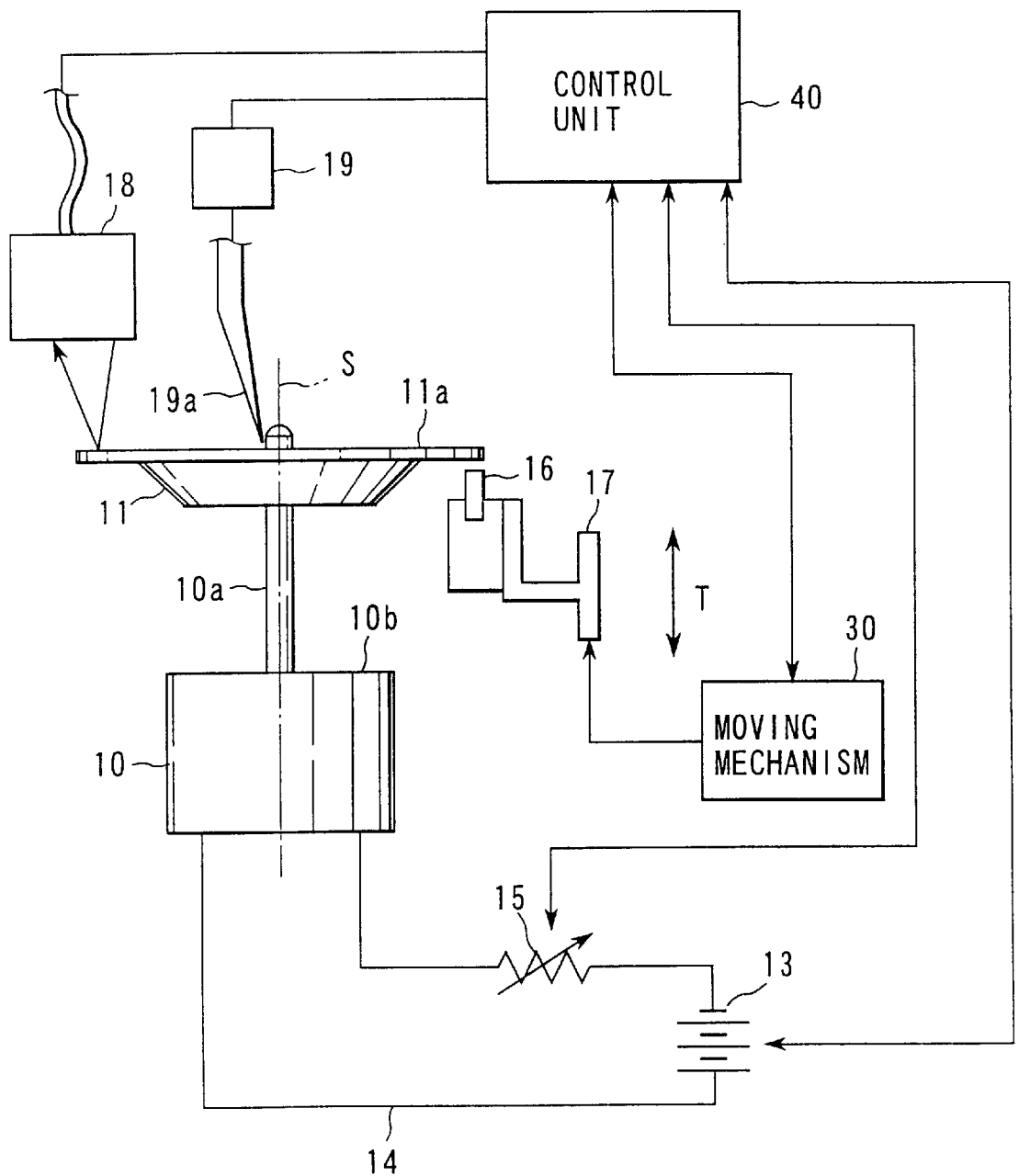
FIG. 1 shows a schematic structure of a disc table attachment/adjustment apparatus according to an embodiment of the present invention.

FIG. 1 shows a schematic structure of a disc table attachment/adjustment apparatus according to an embodiment of the present invention. This apparatus operates to attach a disc table 11 constituting a part of a disc drive to a rotational shaft 10a of a drive motor 10, and to keep high surface precision of a disc mounting surface 11a of the disc table 11 relative to an axis S of the motor rotational shaft 10a.

A spindle motor constituting the drive motor 10 of the disc drive is a general-purpose brushed motor. The disc table 11 is fixed to the rotational shaft 10a, as will be described later.

Figure 2:
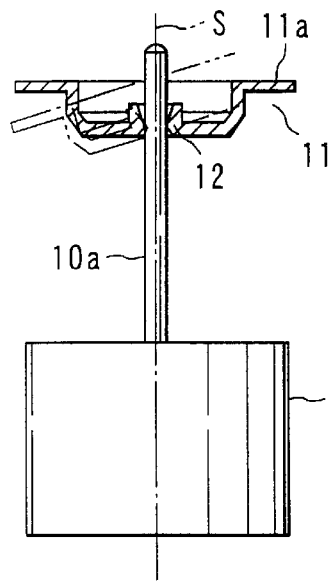
FIG. 2 illustrates an engaging portion of a disc table in the embodiment.

As is shown in FIG. 2, the disc table 11 has an engaging portion 12. The engaging portion 12 is engaged with the rotational shaft 10a of spindle motor 10. The engaging portion 12 comprises a hole portion formed at a center area of the disc table 11. The engaging portion 12 is fitted on the rotational shaft 10a in a "light press-fitting state." In the "light press-fitting state" in this context, the position of the engaging portion 12 relative to the rotational shaft 10a is varied only when an external force of a predetermined level or more is applied. In other words, this position of the engaging portion 12 is maintained in normal cases, while the angle of the disc mounting surface 11a to the axis S of the rotational shaft 10a is variable.

The spindle motor 10 is connected to a circuit 14 including a power supply unit 13 for supplying power to the spindle motor 10. The circuit 14 also includes a variable resistor 15 for controlling the number of revolutions of the spindle motor 10.

An adjusting element 16 holding a roller such as a cam follower is disposed in contact with an outer peripheral portion of the disc table 11, which is fitted on the rotational shaft 10a of spindle motor 10 by means of light press-fitting. The adjusting element 16 is supported by a bracket 17. The adjusting element 16 constitutes urging means which is slightly moved by a moving mechanism 30 in a thrust direction (indicated by a double-headed arrow T).

On the other hand, a non-contact displacement measuring unit 18 is disposed near the disc table 11. The non-contact displacement measuring unit 18 constitutes detection means for emitting a laser beam onto the disc mounting surface 11a of disc table 11 and receiving the reflection beam therefrom, thereby measuring the precision relating to run-out of the disc mounting surface 11a in a non-contact state.

In addition, an adhesive supply unit 19 constituting fixing means is disposed near the disc table 11. The adhesive supply unit 19 has a dispenser 19a for applying a proper amount of adhesive. The dispenser 19a has a supply port directed to a point between the engaging portion 12 of disc table 11 and the motor rotational shaft 10a.

A control unit 40 constituting control means is connected to the power supply unit 13, the variable resistor 15, the moving mechanism 30 supporting adjustment element 16, the non-contact displacement measuring unit 18 and the adhesive supply unit 19. The control unit 40 provides necessary controls to these elements. Specifically, the control unit 40 is an adjusting unit functioning when the disc table 11 is to be attached to the rotational shaft 10a. The control unit 40 performs adjustments not only for fixing the disc table 11 to the rotational shaft 10a but also for maintaining the precision in run-out of the disc mounting surface 11a of the disc table 11 relative to the axis S of the rotational shaft 10a.

More specifically, the spindle motor 10 is rotated at very low speed and the adjusting element 16 is moved in the direction T and brought into contact with the outer periphery of the disc table 11. Then, the adjusting element 16 is further moved by a slight amount.

The non-contact displacement measuring unit 19 always detects the precision in run-out, or displacement, of the disc mounting surface 11a of disc table 11 and feeds the displacement data to the control unit 40. The control unit 40 controls the movement of the adjusting element 16 so that the displacement represented by the displacement data may decrease to a minimum.

When the displacement, or run-out, of the disc table 11 has decreased to a minimum, the control unit 40 stops the rotation of the spindle motor 10. In fact, the adjusting element 16 is unable to effect positioning with a predetermined resolution or less. Thus, a specific displacement value may be set in advance, and if the measured value decreases below the specific displacement value, the spindle motor 10 may be stopped even if the measured value is not a minimum value.

After the rotation of the spindle motor 10 has completely stopped, the adhesive supply unit 19 is driven to apply adhesive through the dispenser 19a. Thus, the disc table 11 is fixed to the rotational shaft 10a. Where the adhesive is of ultraviolet-setting type, ultraviolet is radiated for fixation.

In this way, the disc table 11 is inclinably fitted on the spindle motor rotational shaft 10a. Then, the spindle motor 10 is driven to rotate the disc table 11, while the disc table 11 is being slightly urged. When the displacement data has indicated a minimum value, the spindle motor 10 is stopped and the disc table 11 is fixed to the rotational shaft 10a. Thus, time-consuming, complex machining is not needed for the disc table 11, and high rotational precision is obtained by a relatively simple structure and work.

In this type of brushed motor, a distance between a rotational shaft projection surface 10b of the motor and the disc mounting surface 11a of disc table 11 is standardized. The axial length of the rotational shaft 10a is greater than that of the spindle motor 10 itself. The disc table 11 is attached to a distal end portion of the rotational shaft 10a.

At a glance, the rotational shaft 10a has a considerably "long neck" shape. Even where a high-precision brushed motor is used, if a commercially available disc with low precision of the center of gravity is mounted and rotated, the rotational shaft 10a is rotated with an elastic deformation caused by centrifugal force due to mass eccentricity of the disc.

In other words, even if the disc table 11 is precisely fixed to the rotational shaft 10a using the above-described disc table attachment/adjustment apparatus, if the rotational shaft 10a rotates with an elastic deformation in actual use, run-out will occur with respect to the disc mounting surface 11a of disc table 11.

Figure 3:
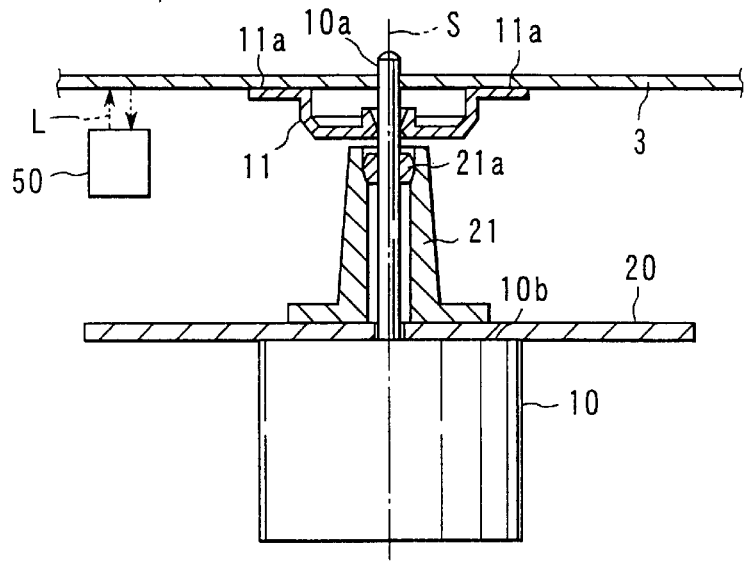
FIG. 3 is a cross-sectional view of a main part of a disc drive according to the embodiment.

To solve this problem, as shown in FIG. 3, the rotational shaft projection surface 10b of spindle motor 10 is fixed to a chassis 20, and the chassis 20 is provided with a bearing member 21 to support the rotational shaft 10a.

The bearing member 21 has such a length as to span the distance between the upper surface of the chassis 20 and the lower surface of the disc table 11. An actual bearing portion 21a for the rotational shaft 10a is provided at a distal end portion of the bearing member 21, which is located near the disc table 11. In FIG. 3, reference numeral 50 denotes a light pickup unit 50 for radiating a laser beam L to the disc 3 to effect information reproduction/recording.

Figure 4:
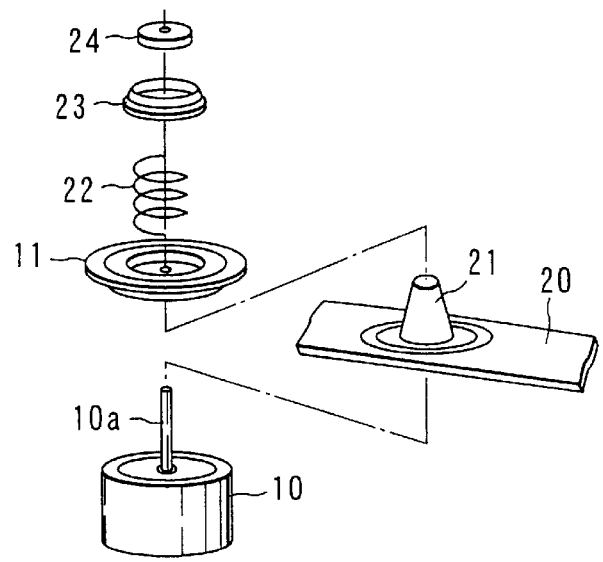
FIG. 4 is an exploded, perspective view showing the main part of the disc drive according to the embodiment.
Figure 5:
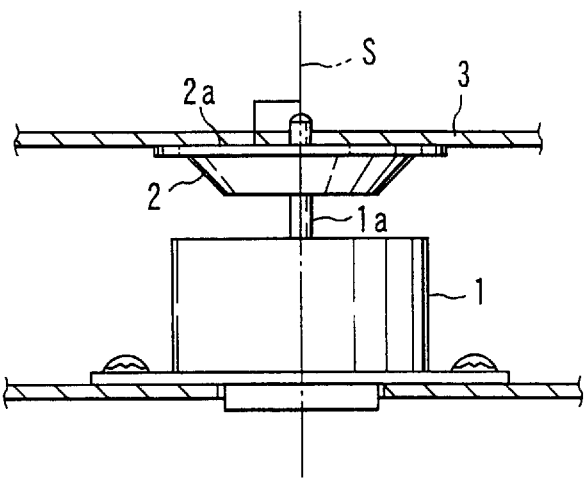
FIG. 5 is a cross-sectional view of a main part of a conventional disc drive.
Figure 6:
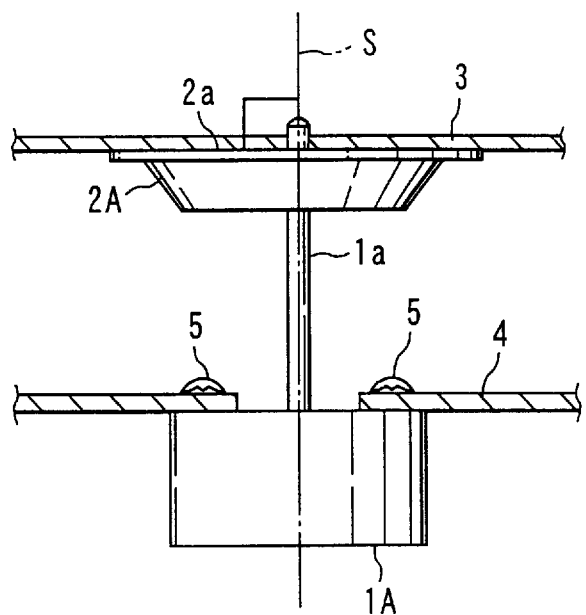
FIG. 6 is a cross-sectional view of a main part of another conventional disc drive.
Figure 7:
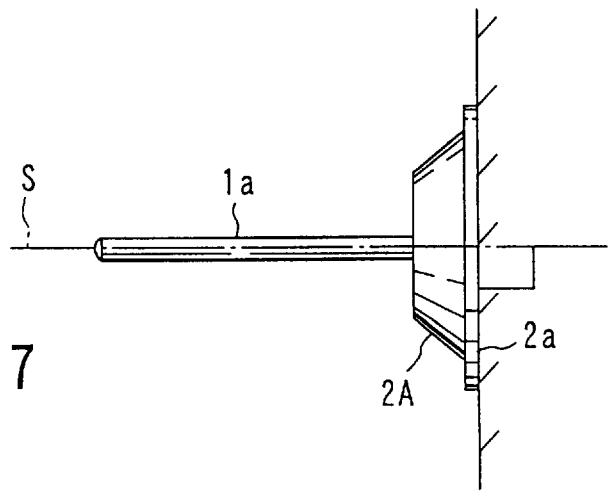
FIG. 7 illustrates a step of increasing the surface precision of the disc table.

FIG. 4 shows structural elements of a centering mechanism for centering when the disc 3 is to be mounted on the disc table 11. The centering mechanism comprises a centering spring 22, a center ring 23 and a clamp magnet 24.

In ordinary drive motors including the above-described spindle motor 10, the rotational shaft is supported at two points within the motor body. A third support point, however, is provided by the above-described bearing member 21. Accordingly, even where the commercially available disc with low precision of the center of gravity is mounted on the disc table 11 and rotated, it is possible to prevent the occurrence of centrifugal force due to mass eccentricity of the disc. Therefore, no elastic deformation of the rotational shaft 10a occurs, run-out of the disc table 11 is prevented, and high rotational precision is maintained.

Needless to say, the present invention is not limited to the above-described embodiment, and various modifications can be made without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a disc drive, the method comprising the steps of:

inclinably fitting a disc table on a rotational shaft;

varying an inclination of the disc table, while detecting the inclination of the disc table which is rotating in a state in which the disc table is inclinable with respect to the rotational shaft; and fixing the disc table to the rotational shaft when the inclination of the disc table has decreased to a predetermined value or less.

2. A method according to claim 1, wherein the disc table is fixed to the rotational shaft after the rotation of the disc table is stopped.

3. An apparatus for manufacturing a disc drive, the apparatus comprising:

urging means, put in contact with a disc table inclinably engaged with a rotational shaft via an engaging portion, for varying an inclination of the disc table with respect to the engaging portion;

detection means for detecting the inclination of the disc table;

control means for receiving a detection signal from the detection means and stopping rotation of the rotational shaft when the inclination of the disc table has decreased to a predetermined value or less; and fixing means for fixing the disc table to the rotational shaft which has been stopped by the control means.

4. An apparatus according to claim 3, wherein a disc to be driven by the disc drive is an optical disc.

5. An apparatus according to claim 3, wherein the rotational shaft is provided on a drive motor.

6. An apparatus according to claim 3, wherein said engaging portion is maintained in a light press-fitting state in which a position of the engaging portion relative to the rotational shaft is unchanged when a force of a predetermined level or less is applied, and an inclination of the disc table is varied when a force of more than the predetermined level is applied.

7. An apparatus according to claim 3, wherein said fixing means is an adhesive supply unit for supplying an adhesive to a point between the rotational shaft and the engaging portion of the disc table.

8. A disc drive comprising:

a drive motor;

a disc table for mounting of an optical disc, the disc table being fixed to a rotational shaft of the drive motor and provided with an engaging portion for inclinable engagement with the rotational shaft of the drive motor;

reproducing/recording means for effecting information reproduction/recording by radiating a laser beam to the optical disc mounted on the disc table;

a chassis fixed to a rotational shaft projection surface of the drive motor; and a bearing member, provided on the chassis, for supporting the rotational shaft which is located near the disc table.

9. A disc drive according to claim 8, wherein a disc to be driven by the disc drive is an optical disc.

10. An optical disc drive comprising:

a drive motor;

a disc table for mounting of an optical disc, the disc table being fixed to a rotational shaft of the drive motor and provided with an engaging portion for inclinable engagement with the rotational shaft of the drive motor;

an adhesive which is provided on an opening portion of the disc table and adheres the rotational shaft and the disc table, such that a relative angle formed by the rotational shaft with the disc table is fixed; and a laser device which effects information reproduction/recording by radiating a laser beam to the optical disc mounted on the disc table.

11. An optical disc drive according to claim 1, wherein the adhesive is a light-setting resin.

12. An optical disc drive according to claim 10, wherein the opening portion is in a light press-fitting state, in which a position of the opening portion relative to the rotational shaft does not vary under a pressure less than a predetermined pressure and its inclination direction at the position is variable.

* * * * *